Jan. 9, 1934.   M. B. BENSON   1,942,795
POWER TRANSMISSION AND SPEED REDUCTION SYSTEM
Filed Feb. 5, 1931   3 Sheets-Sheet 1

INVENTOR
Melvin B. Benson,
BY
ATTORNEYS

Jan. 9, 1934.  M. B. BENSON  1,942,795
POWER TRANSMISSION AND SPEED REDUCTION SYSTEM
Filed Feb. 5, 1931  3 Sheets-Sheet 2

INVENTOR
Melvin B. Benson,
BY
Bartlett Eyre Scott Keel
ATTORNEYS

Jan. 9, 1934.  M. B. BENSON  1,942,795
POWER TRANSMISSION AND SPEED REDUCTION SYSTEM
Filed Feb. 5, 1931  3 Sheets-Sheet 3

INVENTOR
Melvin B. Benson.
BY
ATTORNEYS

Patented Jan. 9, 1934

1,942,795

UNITED STATES PATENT OFFICE 1,942,795

POWER TRANSMISSION AND SPEED REDUCTION SYSTEM

Melvin B. Benson, New York, N. Y., assignor, by mesne assignments, to Melvin B. Benson Corporation, New York, N. Y., a corporation of New York Application February 5, 1931. Serial No. 513,572

7 Claims. (Cl. 74—35)

This invention relates to a power transmission and gear reduction system.

In my application Serial No. 495,035 filed Nov. 12, 1930 I have set forth a constant tension winch including a novel flexible coupling and reduction gear system. The present application is directed more particularly to the novel coupling and reduction gear system of the aforesaid application.

The object of the invention is a gear reduction system and mechanism whereby practically any desired gear reduction ratio may be obtained without multiplication of the gear elements and their sizes, and particularly such a system or mechanism which is characterized by its simplicity in construction and operation, by its compactness in over-all dimensions and by its reliability in operation. More particularly the flexible coupling and reduction gear system of this application includes a relatively stationary gyrating gear traversing an internal gear member with means for restraining the rotation of the gyrating gear including a flexible and yielding connection with the framework. A further object of the invention is a multiple stage reduction gear system generally of the above indicated type and particularly such a multiple stage system with one of said stages, preferably the high speed stage, embodying the flexible coupling. Other objects and features of the invention will hereinafter appear.

For a better understanding of the invention reference may be had to the accompanying drawings forming a part of this application wherein.

Figure 1:
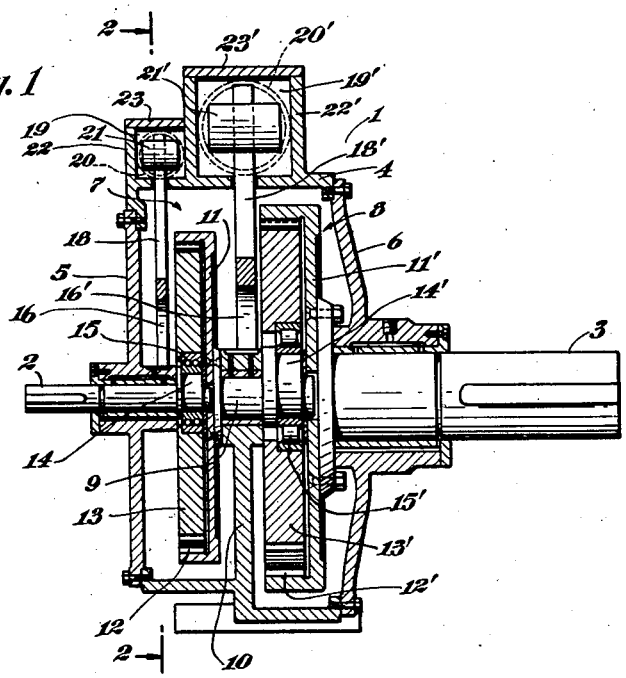
Fig. 1 is a sectional view through a speed reducer in accordance with one embodiment of the invention.
Figure 2:
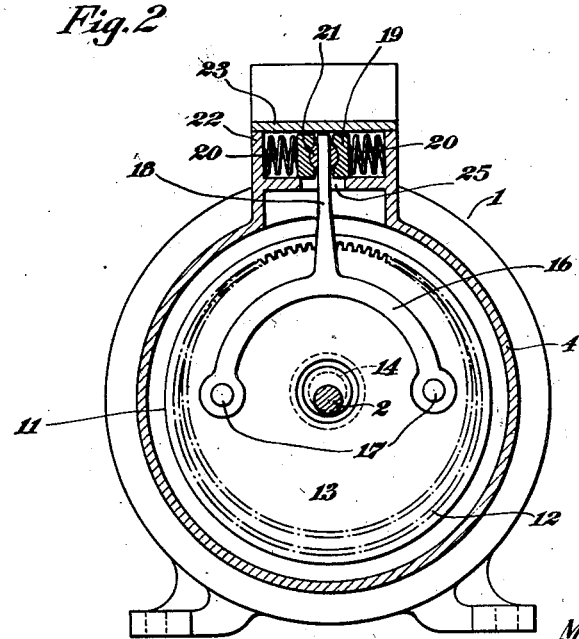
Fig. 2 is a sectional view along the line 2—2 of Fig. 1.

Referring to Figs. 1 and 2 of the drawings I have indicated my speed reducer or power transmission system as including a casing 1, in which are journalled a high and low speed power transmission shaft 2 and 3 respectively. The casing 1 may assume any form desired and in the particular form illustrated comprises a substantially cylindrical part 4, an end disc 5 in which the shaft 2 is journalled and an end disc 6 in which the shaft 3 is journalled. The gear reduction system may include one or more reduction units or stages and in the particular embodiment shown I have indicated a two stage system, the two stages being indicated by the numerals 7 and 8. Intermediate the two units or stages is a shaft 9, the latter being journalled in a web or bulkhead 10 formed as a part of the casing. The shafts 2, 9 and 3 are journalled in alignment with each other. Referring to the stage 7 the stub shaft 9 carries a gear element 11, the latter being secured to the shaft by bolting or otherwise. The gear element 11 is formed with an annular internal gear ring 12 which is traversed by a gyrating spur gear and the spur gear 13 is gyrated and caused to traverse the internal gear 12 by means of an eccentric 14 which is formed as a part of or is fastened or keyed to the shaft 2, the gear 13 being journalled by means of ball bearings 15 upon the eccentric 14. The gear 13 is permitted to have rotation relatively to the eccentric 14 but is restrained and prevented from rotating by means of a lever or yoke 16, the latter being rigidly fastened at 17 to the gear 13 and having rigidly formed therewith a reciprocating arm or lever 18. The latter is yieldingly and adjustably fastened to the casing by means of the spring resisted and restrained bearing block 19 through which it passes, the bearing block having disposed on opposite sides thereof compression springs 20 which normally hold the bearing block 19 in a neutral position with the arm or lever 18 extending vertically. A roller bearing 21 is contained within the bearing block 19 and the lever 18 reciprocates back and forth through an opening formed in this roller bearing 21, while the roller bearing permits angular adjustments of the lever 18 with respect to the bearing block. The bearing block and spring mechanism is contained within a chamber formed by a protuberance 22 on the casing, a suitable cover 23 being provided for the upper part of this chamber, said cover 23 being preferably removable to afford access to the mechanism, while the lower wall of the chamber is formed with a slot 25 permitting the angular movements of the lever 18 in a plane at right angles to the shaft 2.

The stage 8 is substantially identical with the stage 7 and for convenience in description I have referred to similar and corresponding parts thereof by the same reference numerals with prime indications. For example, the shaft 3 carries bolted thereto a driven gear element 11' having an internal gear ring 12' and within this internal gear ring 12' is disposed the gyrating gear 13', the latter being carried by an eccentric 14' which is mounted upon the stub shaft 9. The gyrating gear is journaled by means of ball bearings 15' upon an eccentric 14' and is restrained from rotating by means of the yoke 16' having a reciprocable arm or lever 18' the latter passing through a bearing block and roller bearing unit 19', 20', 21' contained within the chamber formed by the protuberance 22' on the casing.

The operation of the speed reduction system is as follows:

Power being applied to the shaft 2 the spur gear 13 is gyrated and caused to traverse the internal gear 12 resulting thereby in the drive of the gear 12 and the shaft 9 at a reduced speed depending upon the relative number of teeth of the gears 12 and 13. More nearly the teeth of the gear 13 equals the number of teeth in the gear 12 the larger the speed reduction ratio. The gear 13 being restrained by the yoke 16, 17, 18 from rotation transmits the power at reduced speeds from the shaft 2 to the shaft 9, while the spring slide bearing block mechanism interposed between the restraining means and the casing or fixed frame effects a yielding and flexible coupling or drive between the two shafts. Similarly the power is transmitted at reduced speed from the shaft 9 to the shaft 3 through the stage 8 and, of course, the combined speed reduction is the speed reduction ratio of stage 7 multiplied by the speed reduction ratio of stage 8.

Figure 3:
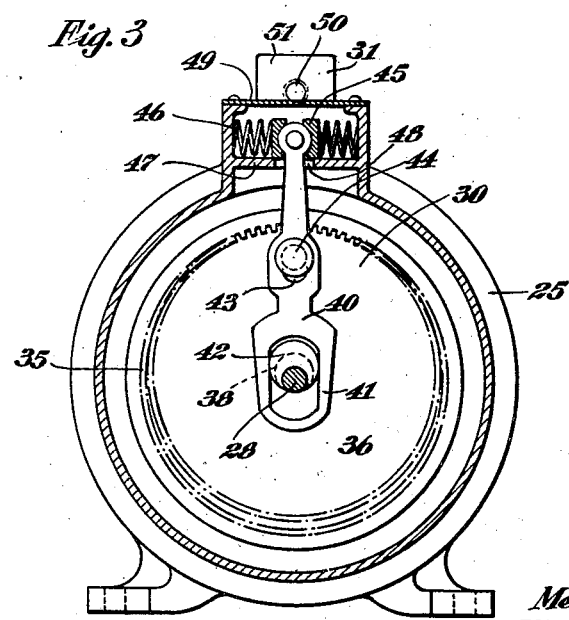
Fig. 3 is a sectional view showing another modified form of my speed reducer.

In the modification of Fig. 3 I have shown a two stage speed reducer with one of the units or stages embodying a flexible coupling. Fig. 3 shows more particularly the flexible coupling stage. The speed reducer is contained in a casing generally of cylindrical form having end closing discs with the high and low speed shafts journalled in these end closing discs. The high speed shaft is indicated at 28, it being understood that the low speed shaft is journalled in alignment with the shaft 28. The reduction gear stages are indicated at 30 and 31, the stage 30 being the one more particularly illustrated in Fig. 3. It is understood that there is journalled between the two stages a stub or drive shaft which may be journalled in a bulkhead or web of the casing 25 or other support, this stub shaft, which is omitted for convenience, being journalled in alignment with the high and low speed shafts. The gear stage 30 includes a gear element carried by the intermediate shaft and having an internal gear ring 35. A gyrating spur gear 36 is adapted to traverse this internal gear ring 35. It is journalled by means of ball bearings upon an eccentric 38 keyed or otherwise fastened to the drive shaft 28. The gyrating gear 36 is prevented from rotation by means of an oscillating lever or yoke 40 having a forked end 41 which straddles an eccentric 42 which forms a part of the eccentric 38 or is formed independently thereof but carried by the shaft 28 in timed relation therewith, this eccentric 42 preferably being twice the size of the eccentric 38. Intermediate its ends the lever or yoke 40 is provided with an elongated slot 43 which accommodates and is traversed by a pin 44 fixed to the gyrating gear 36. The lever or yoke 40 instead of being fixedly pivoted to the frame of the unit is pivoted to a yieldingly mounted bearing unit 45, the latter being retained between a pair of compression springs 46 and reciprocable against the tension of these springs along the bearing shelf or guideway 47, the latter having a slot 48 for permitting the oscillating movements of the lever 40. A cover plate 49 is indicated for gaining access to the bearing block 45 and the springs 46. The drawing is purposely made diagrammatic but it is understood that the yielding means 45, 46 effects a yielding coupling between the gyrating gear 36 and the internal gear 35, thereby providing a flexible and yielding drive. The operaion is as follows:

Power being applied to the drive shaft 28 the gyrating gear 36 is gyrated and caused to traverse the internal gear 35, and since the gear 36 is restrained from rotation power is transmitted to the driven gear 35 at a reduced speed depending upon the relative number of gear teeth in the gears 35 and 36. The slot and guide connections 43 and 44, between the gear 36 and the restraining member 40, permit the free up and down movements of the gyrating gear 36 independently of the restraining member, while the eccentric 42, which is driven in unison with the gyrating eccentric 36, causes the restraining member 40 to oscillate at right angles to the slot 43 and thereby follow the movements of the gyrating gear in a direction at right angles to the relative movements permitted by the slot pin connection 43, 44. By this means the gyrating gear member 36 maintains substantially the same and uniform orientation with reference to the driven gear throughout the gyrating revolution, thereby resulting in uniform pitch line velocity of the driven gear. By having the eccentric 42 twice the size of the eccentric 38 and by having the slot pin connection 43, 44 disposed substantially midway the length the follow-up movement of the member 40 at the point of engagement is substantially equal to the lateral movements assumed by the pin 44. The second stage 31 is similar to the first stage, except that the flexible coupling and drive including the slide block 45 and springs 46 are omitted, the member corresponding to the member 40 being pivoted by a pin 50 to a protuberance 51 extending from the casing. The combined speed reduction ratio of the unit is, of course, the ratios of the two stages multiplied together.

Figure 5:
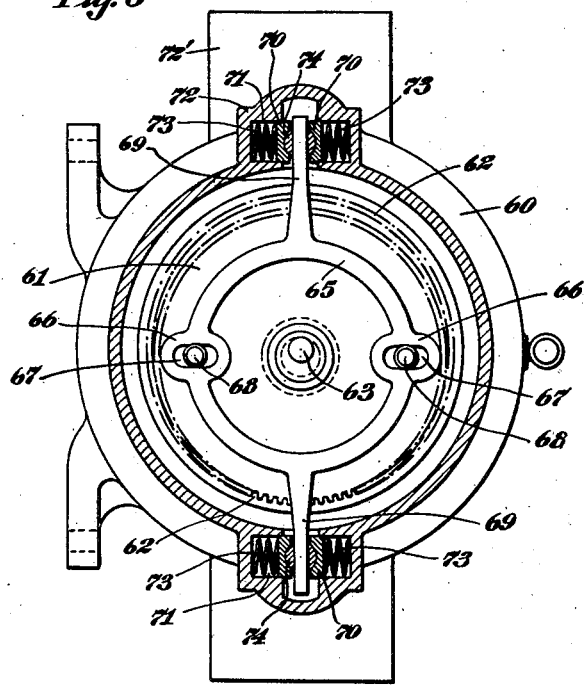
Fig. 5 is a sectional view along the line 5—5 of Fig. 4.
Figure 4:
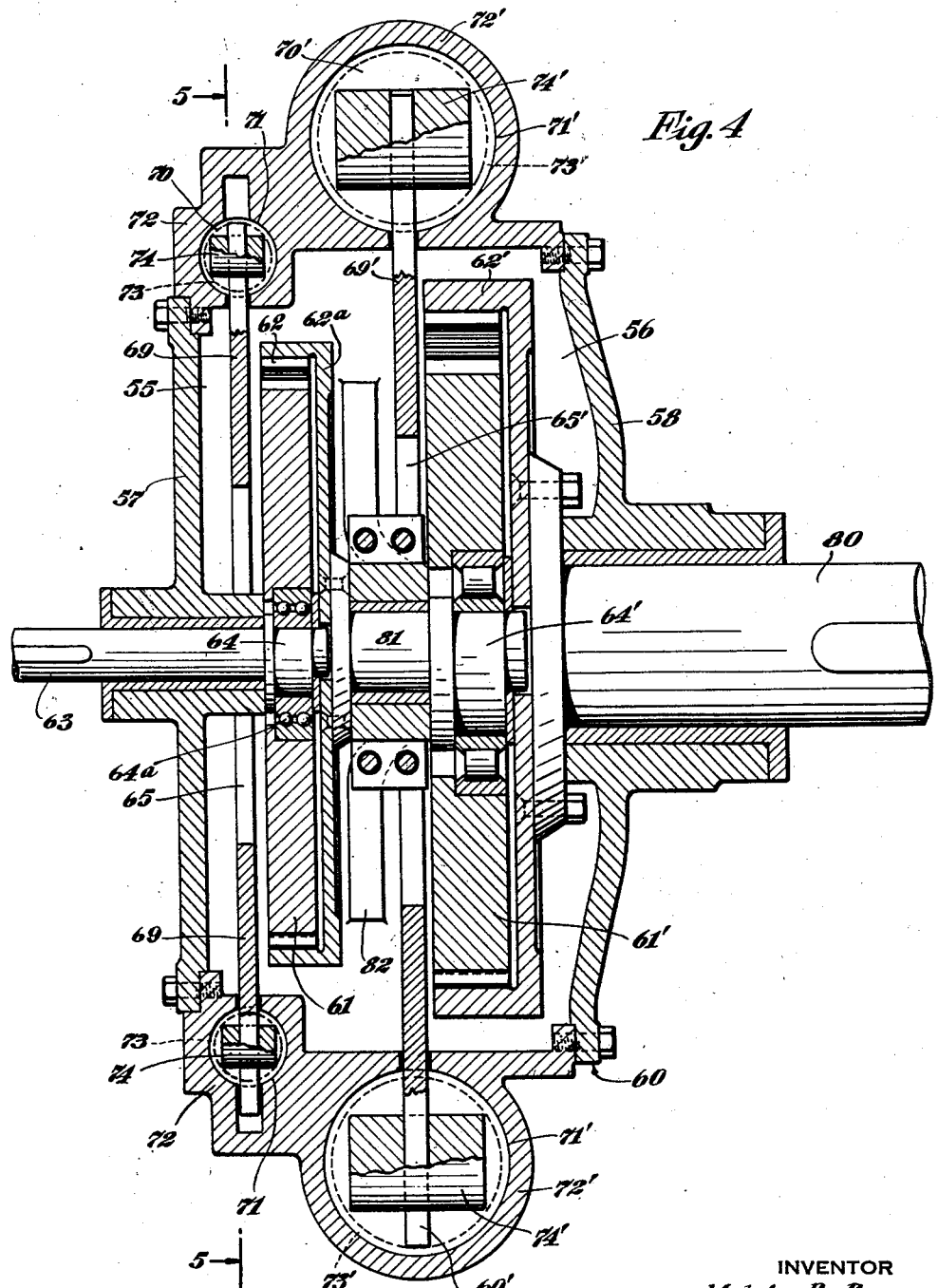
Fig. 4 is a sectional view through the speed reducer in accordance with another modification of my invention.

In the modification of Figs. 4 and 5 the speed reducer is also indicated of the two stage type, the stages being indicated by the numerals 55 and 56. The casing is indicated at 60 which includes end closing discs 57 and 58 in which are journaled respectively the high speed shaft 63 and the low speed shaft 80. An intermediate or stub shaft 81 is journalled in any suitable manner upon a fixed part of the frame, as for example a bulkhead or web 82 formed integrally with the casing. Referring particularly to the stage 55 this includes a gyrating gear 61 and a driven internal gear 62, the latter being formed as a part of the gear element 62a and being bolted or otherwise fixed to the shaft 81. The shaft 63 carries an eccentric 64 for gyrating the gear 61 and causing the latter to traverse the internal gear 62, the gyrating gear 61 being journaled by ball bearings 64a upon the eccentric. The gyrating gear is prevented from rotation by means of a yoke member 65, the latter being indicated as in the form of a ring with enlargements 66 having elongated slots 67 on either side thereof in which slots move back and forth pins 68 carried by the gyrating gear 61. These elongated slots permit free movement of the gyrating gear in one direction. The yoke 65 is yieldingly carried by and fastened to the frame 60 and for this purpose is provided with a pair of oppositely disposed reciprocating shafts or arms 69, the latter passing through bearing blocks 70 carried in chamber 71 formed in the protuberances 72 of the casing. These bearing blocks are yieldingly held in center position by means of oppositely disposed springs 73 and each bearing block is provided with a roller bearing 74 through which the reciprocating shaft or arm 69 freely passes. By this means the pins 68 cause the yoke 65 to follow the movements of the gyrating gear in a direction at right angles to the slots 67, while the slots 67 permit the free movement of the pins of the gyrating gear in a direction at right angles to the reciprocating arms 69. By the means here shown the orientation of the gyrating gear with respect to the internal gear is maintained substantially uniform and the same through each gyrating revolution, resulting in substantially uniform pitch line velocity of the internal gear, while the spring sliding block mounting for the yoke contributes the flexible and yielding coupling feature to the speed reducer unit. The other stage 56 need not be described in detail and for convenience I have indicated corresponding parts of this stage by the same reference numerals with primes. For example, the gyrating spur gear is indicated at 61' and is gyrated by means of an eccentric 64' which is keyed to or forms a part of the stub shaft 81. The internal gear ring is indicated by the numeral 62' which is bolted or otherwise secured to the driven shaft 80. The yoke member for restraining the rotation of the gyrating gear is indicated at 65' with the reciprocating arms 69' passing through a roller bearing sliding block spring resisted means indicated by the numeral 70', 71', 72', 73', and 74'. The operation of this stage 55 and the combined speed reduction is the speed reduction ratio of stage 55 multiplied by that of stage 56.

I claim:

1. A speed reduction unit comprising a casing, a drive shaft, a driven shaft, an internal gear element driving said driven shaft, an eccentric driven by the drive shaft, an intermediate gear of a lesser number of teeth than the internal gear journalled upon said eccentric and caused to traverse the internal gear element when the eccentric is rotated, a chamber in said casing having a sliding bearing block therein, a spring mechanism biasing said bearing block, and a rotation restraining arm projecting from the intermediate gear and having a pivotal connection with the bearing block permitting inclinations of the arm with respect thereto.

2. A speed reduction unit comprising a casing, a drive shaft, a driven shaft, an internal gear element driving said driven shaft, an eccentric driven by the drive shaft, an intermediate gear of a lesser number of teeth than the internal gear journalled upon said eccentric and caused to traverse the internal gear element when the eccentric is rotated, a chamber in said casing having a sliding bearing block therein, a spring mechanism biasing said bearing block, and a rotation restraining arm projecting from the intermediate gear and having a pivotal connection with the bearing block permitting inclinations of the arm with respect thereto, including connections between the casing and the intermediate gear permitting the gyrating movements of the intermediate gear relatively to the internal gear.

3. A speed reduction unit comprising a frame, a drive shaft journalled in said frame, a driven shaft journalled in said frame, an internal gear element driving said driven shaft, an eccentric driven by the drive shaft, an intermediate gear of a lesser number of teeth than the internal gear journalled upon said eccentric and caused to traverse the internal gear element when the eccentric is rotated, means for normally preventing rotation of the intermediate gear element upon the eccentric, resilient means interposed in the rotation preventing means for cushioning the drive in either direction of rotation, and connections between the frame and the intermediate gear permitting the gyrating movements of the intermediate gear relatively to the internal gear, the rotation restraining means comprising an arm rigidly fastened at one end to the intermediate gear and at the other end having a pivotal and sliding connection with the resilient and cushioning means.

4. A speed reduction drive comprising a frame, a driven internal gear element, a driven gyrating gear element of a lesser number of teeth than the internal gear with means for gyrating the same and causing it to traverse the internal gear element, a biasing and cushioning mechanism and retaining means therefor carried by the frame, and a rotation restraining member having a rotation restraining connection with said gyrating gear and having a connection with the biasing mechanism permitting inclinations of the member in planes at right angles to the axis of gyration of the gyrating gear.

5. In a gyral gear drive, a frame, a driven internal gear element, a driven gear element within said internal gear element, means for gyrating said last named gear and causing it to traverse the periphery of the internal gear element, and means for normally preventing rotation of said gyrating gear and cushioning the drive, notwithstanding the gyrations thereof, comprising a biasing and cushioning mechanism mounted on the frame, a member having a connection with the biasing and cushioning mechanism permitting inclinations thereof in planes transverse to the axis of the gyration and a rotation restraining connection with the gyrating gear, one of said connections permitting relative radial movements.

6. In a gyral gear drive the combination of the drive shaft and a driven shaft with a speed reduction means therebetween, including an internal gear element, a gear element within said internal gear element, one of said elements being adapted to gyrate and traverse the other element, means for normally preventing rotation of the gyrating gear element and cushioning the drive, notwithstanding gyrations of the gear, comprising a member having a rotation restraining connection with the gyrating gear and a connection with the frame, the latter connection permitting inclinations of the arm at right angles to the axis of gyration and one of said connections permitting relative movements in a radial direction between the gyrating gear and the frame and one of said connections embodying a cushioning mechanism to absorb shocks upon the gyrating gear at any point in its gyrating revolution.

7. In a gyral gear drive of the character set forth in claim 4 wherein the rotation restraining member has a pin slot connection with the gyrating gear permitting relative radial movements between the member and the arm.

MELVIN B. BENSON.